United States Patent [19]
Korisch et al.

[11] Patent Number: 5,986,608
[45] Date of Patent: Nov. 16, 1999

[54] ANTENNA COUPLER FOR PORTABLE TELEPHONE

[75] Inventors: Ilya Korisch, Eatontown; Romano Zambon, Sea Bright, both of N.J.

[73] Assignee: Lucent Technologies Inc., Murray Hill, N.J.

[21] Appl. No.: 09/054,006

[22] Filed: Apr. 2, 1998

[51] Int. Cl.⁶ ..................................................... H01Q 1/24
[52] U.S. Cl. .......................... 343/702; 343/713; 343/841; 325/312
[58] Field of Search .................................. 343/702, 713, 343/715, 841; 325/312

[56] References Cited

U.S. PATENT DOCUMENTS

| | | | |
|---|---|---|---|
| 4,031,468 | 6/1977 | Ziebell et al. | 325/312 |
| 5,835,071 | 9/1996 | Phelps | 343/906 |
| 5,852,421 | 12/1996 | Maldonado | 343/702 |

*Primary Examiner*—Don Wong
*Assistant Examiner*—James Clinger

[57] ABSTRACT

The present invention provides a system for coupling a portable telephone with a built-in antenna to an external antenna. The portable telephone built-in antenna includes an exposed direct electrical contact at its base. When the portable telephone unit is placed into a receiving cavity in in external antenna coupling unit, the exposed contact is engaged by an antenna clip for connection to the external antenna. A two-section choke in the coupling unit provides shielding for the built-in antenna. The first section of the choke is coupled to the ground plane of the portable telephone, and the second section of the choke surrounds the antenna. In a preferred embodiment of the invention, the choke provides shielding of the built-in antenna at a lower and at a higher frequency band.

18 Claims, 5 Drawing Sheets

ANTENNA COUPLER FOR PORTABLE TELEPHONE

BACKGROUND OF THE INVENTION

1. Field of the Invention

The present invention relites generally to improvements in antenna technology, and particularly to advantageous aspects of an antenna coupler for use with portable telephones.

2. Description of the Prior Art

Portable handheld wireless communications devices, especially telephones, have increased dramatically in popularity over the past several years. Because of the proliferation of new wireless services into various frequency bands, including previously unused frequency bands, there has developed a need for a portable telephone operating in more than one frequency band. For example, a portable telephone may be called to operate in both the cellular frequency band (824–896 MHz) and the personal communications system (PCS) band (1850–1990 MHz).

When the portable telephone is used inside an automobile, the signal level is significantly reduced due to shielding effects of the car body. Even the presence of other occupants within the vehicle may contribute to the shielding. In order to mitigate these effects, the portable telephone is typically coupled to an antenna external to the vehicle. In one system, an external antenna coupling unit kit is installed in the interior of the vehicle. The kit includes a shell that has a cavity that is shaped to receive the portable telephone unit, and a coaxial cable connection to an antenna mounted to the exterior of the vehicle.

Typical prior-art devices provide electromagnetic coupling between the telephone's built-in antenna and the vehicle's external antenna. This generally results in high transmission loss (weak coupling), which in turn makes it necessary to use additional bi-directional amplifiers for loss compensation. Further, prior designs do not typically provide for a dual band operation of the device.

Consequently, there is a need for a low-loss antenna coupler transferring the signal to and from the external antenna in at least two frequency bands.

SUMMARY OF THE INVENTION

The present invention provides a system for coupling a portable telephone with a built-in antenna to an external antenna. The portable telephone built-in antenna includes an exposed direct electrical contact at its base. When the portable telephone unit is placed into a receiving cavity in an external antenna coupling unit, the exposed contact is engaged by an antenna clip for connection to the external antenna. A two-section choke in the coupling unit provides shielding for the built-in antenna. The first section of the choke is coupled to the ground plane of the portable telephone, and the second section of the choke surrounds the antenna. In a preferred embodiment of the invention, the choke provides shielding of the built-in antenna at a lower and at a higher frequency band.

Additional features and advantages of the present invention will become apparent by reference to the following detailed description and accompanying drawings.

DETAILED DESCRIPTION

A portable telephone including a fixed antenna that is operable in two bands (cellular and PCS) is disclosed in U.S. Pat. No. ____ to Garner et al. (U.S. patent application Ser. No. 08/861,588, filed on May 22, 1997), owned by the same assignee as the present invention, which is hereby incorporated by reference.

Figure 1:
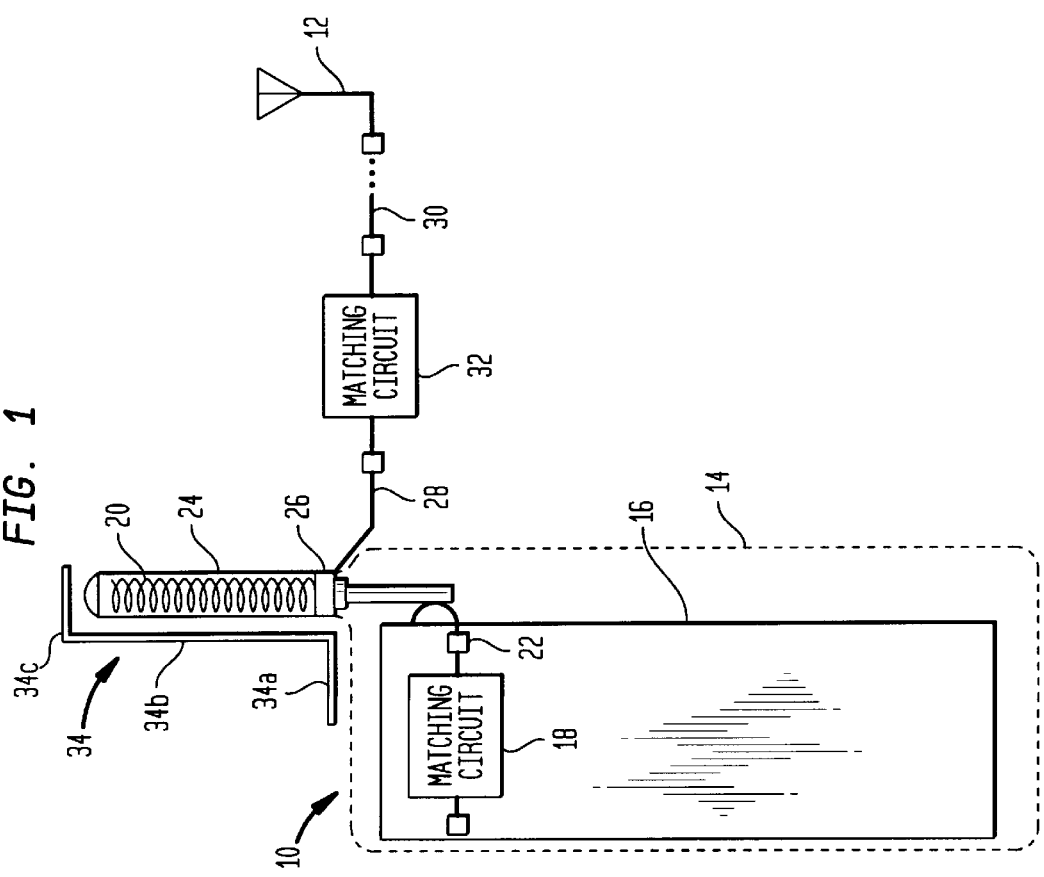
FIG. 1 shows a diagram of a preferred embodiment of a dual-band antenna coupler system according to the present invention.

The present invention provides an apparatus and methods for direct coupling of radio frequency (RF) energy from a portable telephone's built-in antenna to an external antenna over multiple frequency bands. FIG. 1 shows a diagram of a preferred embodiment of a system according to the present invention, in which a portable telephone 10 is coupled with an antenna 12 mounted to the exterior of an automobile or other vehicle. The portable telephone 10 includes a plastic housing 14, which encases a printed wiring board (PWB) 16. PWB 16 includes a matching circuit 18 that is connected to the telephone's built-in helical antenna 20 by means of an output terminal 22. The helical antenna is covered with a plastic sheath 24.

A matching circuit suitable for use in the present preferred embodiment is described in Garner et al., cited above. The matching circuit substantially cancels the reactive portion of the impedance of the antenna for cellular and PCS frequency bands and substantially equalizes the resistive portion of the impedance of the antenna to the resistive portion of the output impedance of the radio transceiver device. The length of the antenna is such that together with the matching circuit, the resistive portion of the impedance of the antenna is substantially the same for both frequency bands.

Figure 2:
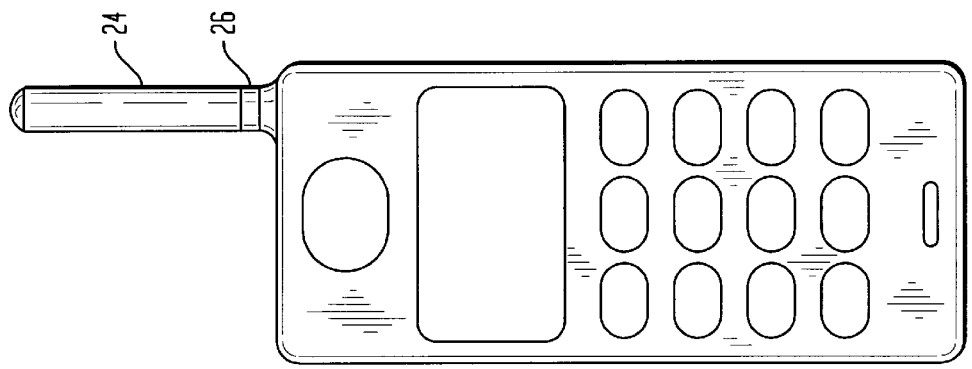
FIG. 2 shows a front view of a portable telephone for use in the system shown in FIG. 1.

Helical antenna element 20 includes an exposed metallic portion 26, which is used to provide a direct electrical contact between the built-in antenna 20 and the external antenna 12. This exposed metallic portion is preferably ring-shaped and disposed at the base of plastic sheath 24. This is illustrated in FIG. 2, which shows a front view of a telephone handset according to the present invention. It will be appreciated that it would be possible to practice the present invention with any of a number of configurations for the telephone handset, so long as the handset provides for direct (i.e., rather than electromagnetic) coupling with the telephone's built-in antenna 20.

The exposed metallic ring 26 is engaged by a metal antenna clip 28 to connect the telephone unit to external antenna 24 via a coaxial cable 30. In one embodiment of the invention, a second matching circuit 32 is provided between the metal clip and the coaxial cable. The invention further includes a choke element 34, comprising a first section 34a and a second section 34b, which provide electromagnetic shielding of the built-in antenna.

Figure 3A:
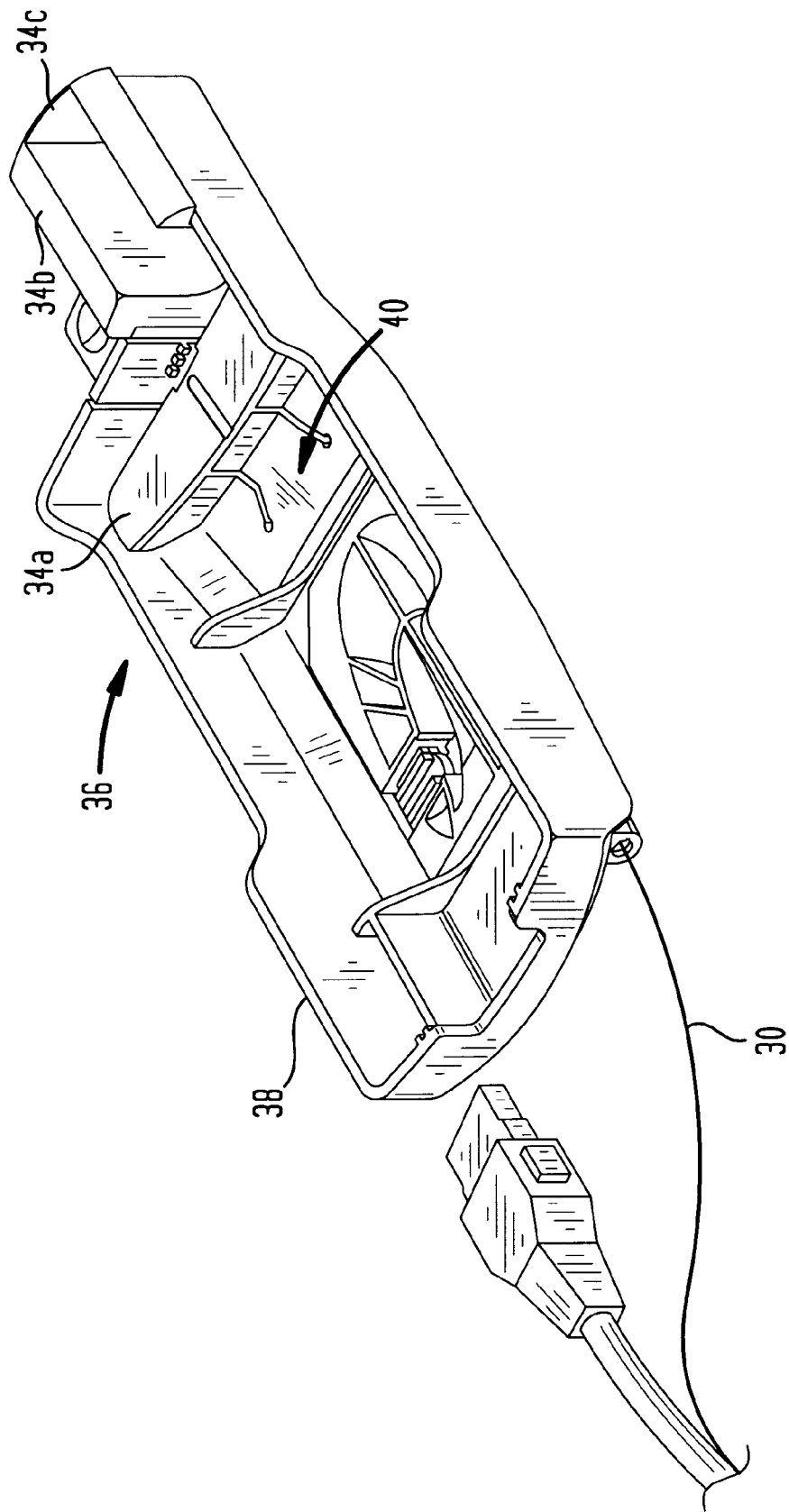
FIGS. 3A and 3B show perspective views, assembled and exploded, of an external antenna coupling unit for use in the system shown in FIG. 1.
Figure 3B:
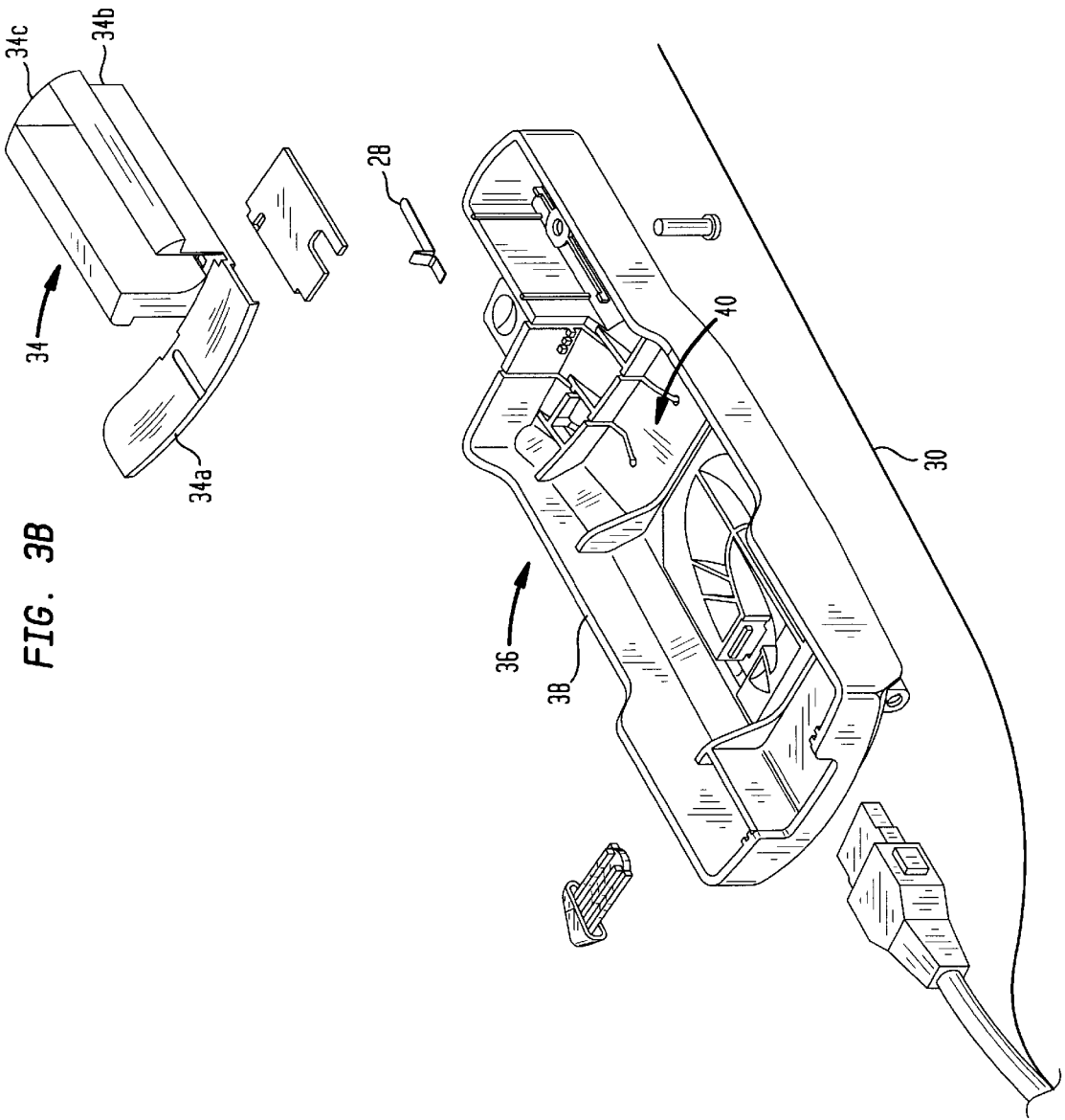

FIGS. 3A and 3B show perspective views, assembled and exploded, of an external antenna coupling unit 36 according to the present invention. The car kit includes a shell 38 with a cavity 40 shaped to receive a portable telephone and hold it in a predetermined configuration. Thus, when the portable telephone 10 shown in FIG. 2 is properly seated within the coupling unit 36, the metallic ring 26 at the base of the built-in antenna is engaged by a metallic contact clip 28, thereby completing the connection between the telephone and the external antenna.

The two-section choke 34 is mounted into the shell 38 of the coupling unit. When the telephone is properly seated in the coupling unit, it will be seen that the first and second sections 34a and 34b of the choke will be held in a predetermined configuration relative to the telephone's built-in antenna 20. In a preferred embodiment, the choke 34 is a one-piece molded plastic insert, onto which a metallic coating is applied, as described below, to achieve the desired shielding and coupling effects. As shown in FIG. 3B, the first section 34a of the choke is provided by a flat portion of the insert. The second section 34b of the choke is a trough having rear and side walls that surround the telephone's built-in antenna when the portable telephone is seated in the coupling unit 36. The second section 34b of the choke further includes an end wall 34c that is proximate to the tip of the telephone's built-in antenna 20.

Figure 4A:
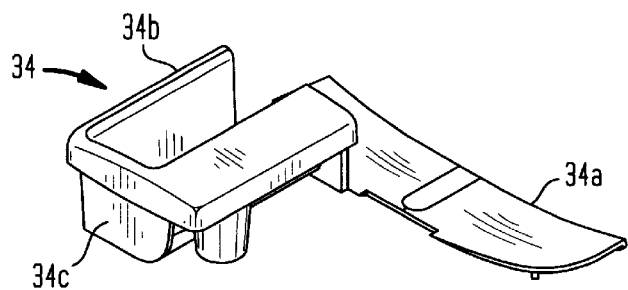
FIG. 4A shows a perspective view of a choke insert for use in the car kit shell shown in FIGS. 3A and 3B.
Figure 4B:
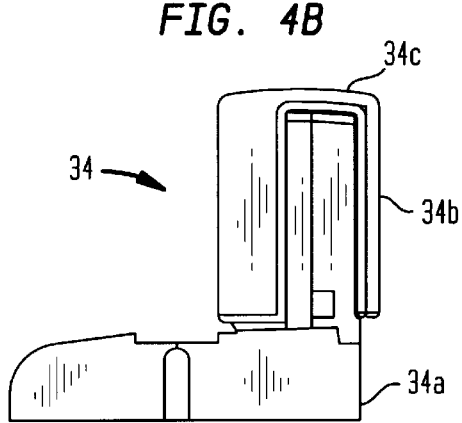
FIGS. 4B–E show, respectively, front, right side, rear, and top views of the choke insert shown in FIG. 4A.
Figure 4C:
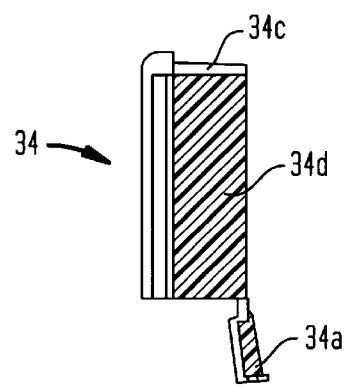
Figure 4D:
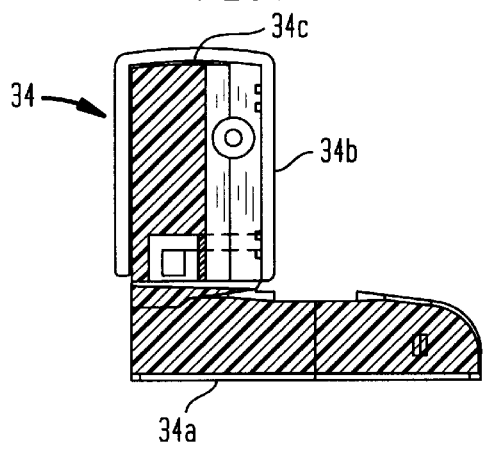
Figure 4E:
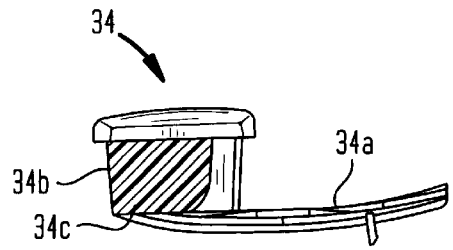

The choke 34 is shown in greater detail in FIGS. 4A–E. As shown by the shaded area in FIGS. 4C–E, a shielding material, i.e., a metallic coating, is applied to the rear surface of the first section of the choke, and to the rear, side, and top surfaces of the second section of the choke. In addition, as shown in FIG. 4D, there is a strip 34d on the right side wall of the section choke section without shielding material, i.e., a strip onto which the metallic coating is not applied. The strip is perpendicular to the longitudinal axis of the built-in antenna. As described below, the non-metallic strip 34d allows the choke to provide shielding at lower and higher frequency bands.

Figure 5:
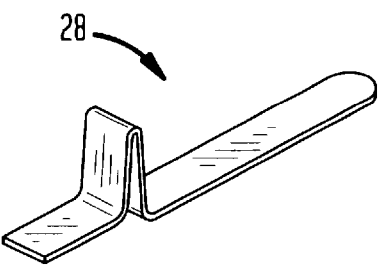
FIG. 5 shows a perspective view of an antenna clip for use in the car kit shell shown in FIGS. 3A and 3B.
Figure 6:
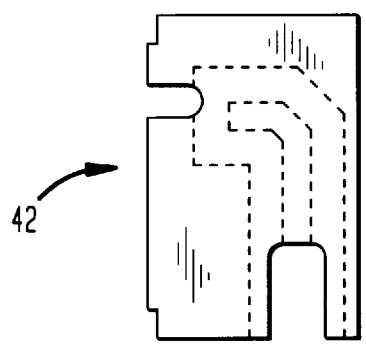
FIG. 6 shows a front view of a printed wiring board (PWB) for use in the car kit shell shown in FIGS. 3A and 3B.
Figure 7:
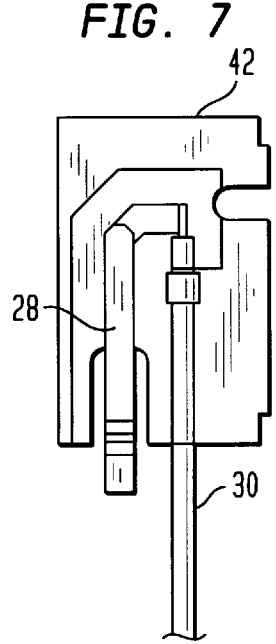
FIG. 7 shows a rear view of the PWB shown in FIG. 6, with the antenna clip shown in FIG. 5 and a coaxial cable mounted thereto.

FIG. 5 shows a perspective view of an antenna clip for use in the external antenna coupling unit shown in FIGS. 3A and 3B. The antenna clip is preferably soldered onto a printed wiring board (PWB) 42, such as that shown in FIG. 6, which is mounted to the shell of the external antenna coupling unit. FIG. 7 is a rear view of the PWB 42 shown in FIG. 6, onto which the antenna clip 28 has been soldered. FIG. 7 further shows coaxial cable 30, also soldered to the PWB 42, which is used to connect the telephone's built-in antenna to the vehicle's external antenna. In an alternative embodiment of the present invention, it would be possible for the PWB 42 to include the second matching circuit 32 shown in FIG. 1.

As shown in FIGS. 1–7, the present design provides a direct electrical connection between the telephone's built-in antenna and the vehicle's external antenna, thereby facilitating dual band coupling. The choke 34 serves to confine electromagnetic fields of the portable telephone built-in antenna to a small volume, preventing unwanted radiation.

In addition, the choke 34 minimizes mismatch in the coupler. When the telephone 10 is placed into the coupling unit 36, both the telephone antenna and the external antenna are connected to the output of the telephone. Absent choke 34, this could lead to a considerable impedance mismatch as well as the reduction in efficiency, since part of the power would be delivered to and radiated by the telephone antenna inside the vehicle rather than the external antenna. However, the two-section choke 34 prevents this from occurring.

The first section 34a of the choke is positioned close to the ground plane of the telephone. Although the invention can be practiced with the first section 34a of the choke in direct electrical contact with the ground plane, in the present preferred embodiment of the invention, the choke is shaped and positioned to provide a low impedance coupling to the ground plane of the telephone unit. This means that the first section 34a of the choke either has to provide substantial capacitive coupling to the ground plane, or alternatively form an open-ended transmission line close to a multiple of a ¼ wavelength long with the ground plane of the telephone, thereby providing electromagnetic coupling.

The second section 34b of the choke is designed to form a substantially ¼ wavelength transmission line with the helical antenna 20 of the phone at the lower frequency band. This line is loaded at the end with capacitance formed by the top wall 34c of the second section 34b of the choke and the tip of the telephone's built-in helical antenna 20.

At the higher frequency band, the electrical length of this line is between ⅝ and ¾ of the wavelength. As shown in FIG. 4C, in order to provide for high impedance looking into the telephone helical antenna in both the lower and higher frequency bands, thereby ensuring low loss from the output of the telephone to the external antenna, no metallic coating is applied to a selected portion of the side wall of the section second 34b. As shown in FIG. 4C, the uncoated portion of the side wall is a strip 34d that is perpendicular to the longitudinal axis of the portable telephone's built-in antenna 20. It will be appreciated that this non-metallic strip 34d, in effect, creates a second choke of different length and frequency response. The size and location of the strip 34d is chosen to produce electromagnetic shielding at the higher of the two frequency bands in which the telephone is operating. It would also be possible to practice the present invention by providing an appropriately sized slot in the side wall of the choke.

While the foregoing description includes details of presently preferred embodiments which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A unit for coupling a portable telephone having a built-in antenna to an external antenna, comprising:

a shell having a cavity shaped to receive the portable telephone;

an antenna clip mounted in the shell for connecting the portable antenna built-in antenna to the external antenna, the antenna clip being positioned in the shell such that when the portable telephone is received into the cavity, the antenna clip engages an exposed direct electrical contact mounted on the built-in antenna;

a choke mounted in the shell for providing electromagnetic shielding of the built-in antenna, the choke including a first section that is coupled to a ground plane of the portable telephone when the portable telephone is received into the shell cavity, and a second section that substantially surrounds the portable telephone built-in antenna when the portable telephone is received into the shell cavity, the choke providing high impedance at an operating frequency band of the telephone, thereby minimizing impedance mismatch between the built-in antenna and the external antenna and ensuring low loss between the telephone and the external antenna at the operating frequency band.

2. A unit according to claim 1, wherein the first section of the choke is coupled to the ground plane by a direct connection.

3. A unit according to claim 1, wherein the first section of the choke is coupled to the ground plane electromagnetically.

4. A unit according to claim 1, wherein the first section of the choke is coupled to the ground plane capacitively.

5. A unit according to claim 1, wherein the second section of the choke is a trough having an open front, such that when the portable telephone unit is received into the shell cavity, the built-in antenna is surrounded by rear and side walls of the trough.

6. A unit according to claim 5, wherein the trough includes an end wall that is proximate to the tip of the antenna when the portable telephone is received into the shell cavity, such that there is a capacitance between the tip of the antenna and the end wall of the trough.

7. A unit according to claim 1, wherein the portable telephone is operable in a lower and a higher frequency band, and in which the choke provides shielding of the built-in antenna at both the lower and higher frequency bands, the choke providing high impedance at both the lower and higher frequency bands, thereby minimizing impedance mismatch between the built-in antenna and the external antenna and ensuring low loss between the telephone and the external antenna at both the lower and higher frequency bands.

8. A unit according to claim 7, wherein the portable telephone is operable in a cellular frequency band (824–896 MHz) and in a personal communications band (1850–1990 MHz).

9. A unit according to claim 7, wherein a side wall of the choke includes a strip without shielding material, the strip being positioned such that the choke provides shielding at the higher frequency band.

10. A unit according to claim 9, wherein the strip is perpendicular to the longitudinal axis of the portable telephone antenna.

11. A unit according to claim 10, wherein the choke is a molded piece of plastic, wherein the shielding material is a metallic coating applied to the plastic, and wherein the strip is created by not applying the metallic coating to a selected portion of the plastic.

12. A unit according to claim 1, wherein the antenna clip is mounted to a printed wiring board for connection to the external antenna.

13. A unit according to claim 11, wherein the printed wiring board includes a matching circuit for adjusting the impedance of the external antenna in response to the frequency band used by the portable telephone.

14. A unit according to claim 1, wherein when the portable telephone is placed into the external antenna coupling unit, the antenna clips engage an exposed direct electrical contact mounted at the base of the built-in antenna.

15. A unit according to claim 14, wherein the built-in antenna is encased in a plastic sheath, and wherein the exposed contact is a metallic ring mounted onto the built-in antenna at the base of the sheath.

16. A system for coupling a portable telephone having a built-in antenna to an external antenna, comprising:

an exposed direct electrical contact mounted to the portable telephone built-in antenna;

a shell having a cavity shaped to receive the portable telephone;

an antenna clip mounted in the shell for connecting the portable telephone built-in antenna to the external antenna, the antenna clip being positioned in the shell such that when the portable telephone is received into the cavity, the antenna clip engages the exposed direct electrical contact mounted to the portable telephone the built-in antenna;

a choke mounted in the shell for providing electromagnetic shielding of the built-in antenna, the choke including a first section that is coupled to a ground plane of the portable telephone when the portable telephone is received into the shell cavity, and a second section that substantially surrounds the portable telephone built-in antenna when the portable telephone is received into the shell cavity, the choke providing high impedance at an operating frequency band of the telephone, thereby minimizing impedance mismatch between the built-in antenna and the external antenna and ensuring low loss between the telephone and the external antenna at the operating frequency band.

17. A system according to claim 16, further including:

an external antenna mounted to the exterior of an automobile; and a coaxial cable connecting the antenna clip to the external antenna.

18. A method for coupling a portable telephone having a built-in antenna to an external antenna, comprising:

connecting the portable telephone built-in antenna to the external antenna by a direct electrical connection;

coupling a first section of a two-section choke proximate to a ground plane of the portable telephone;

surrounding the built-in antenna with a second section of the two-section choke, such that the choke provides electromagnetic shielding of the built-in antenna, the choke providing high impedance at an operating frequency band of the telephone, thereby minimizing impedance mismatch between the built-in antenna and the external antenna and ensuring low loss between the telephone and the external antenna at the operating frequency band.

* * * * *